UNITED STATES PATENT OFFICE.

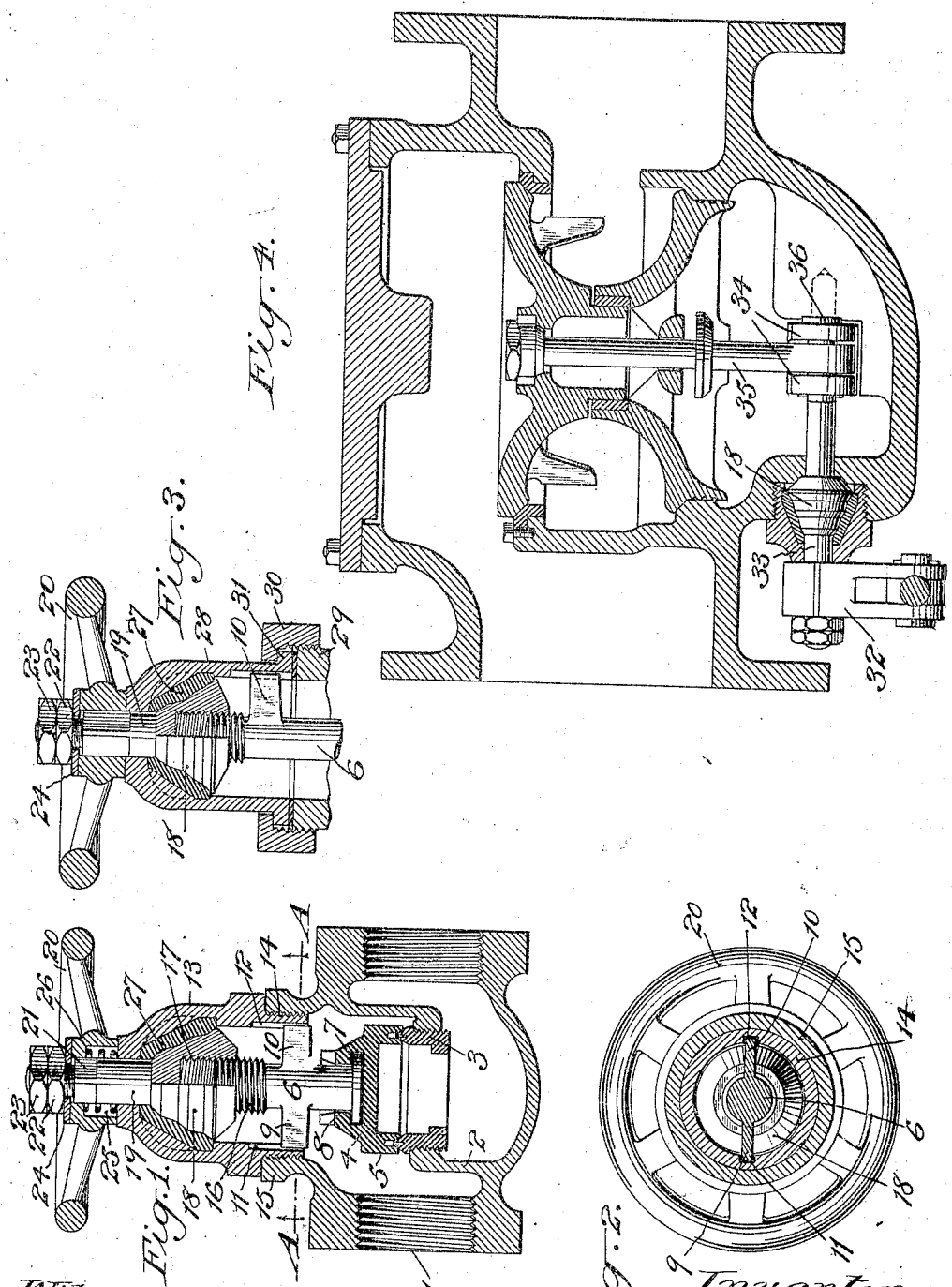

JOHN S. CHAMBERS, OF ROCKY MOUNT, NORTH CAROLINA.

VALVE.

993,026.

Specification of Letters Patent.   Patented May 23, 1911.

Application filed July 28, 1910.   Serial No. 574,287.

*To all whom it may concern:*

Be it known that I, JOHN S. CHAMBERS, a citizen of the United States, and resident of Rocky Mount, in the county of Nash and State of North Carolina, have invented a new and useful Improvement in Valves, of which the following is a specification.

My invention relates to valves with the object in view of providing effective metallic packing for the valve rod and means for operating the valve without moving the valve operating rod longitudinally within the packing.

A practical embodiment of the invention is represented in the accompanying drawings in which, Figure 1 represents a valve and its operating stem and rod in connection with a pipe, the view being a central section through the valve and pipe. Fig. 2 is a transverse section of the same in the plane of the line A—A of Fig. 1. Fig. 3 is a similar view of the valve bonnet and part of its operating stem and rod, showing a modified structure, and Fig. 4 is a section through a valve and pipe, showing a further modification.

Referring to the form shown in Figs. 1 and 2, 1 represents a pipe or coupling provided with a diaphragm 2 in which there is located a valve seat 3, in the present instance, the seat 3 being an annular ring provided with an external screw-thread for screwing into the diaphragm 2. The head is denoted by 4 and is provided with an annular flange 5 for partially embracing the tapered upper edge of the valve seat 3 when closed. The stem of the valve is denoted by 6. The said stem is provided at one end with a flange 7 by means of which it is swiveled in an undercut socket 8 in the valve head 4. The said stem is further provided with laterally extending wings 9 and 10 adapted to enter and slide in grooves 11 and 12 in the lower end of a bonnet 13. The lower end of the bonnet 13 is, in this instance, externally screw-threaded, as at 14, for engaging the internal screw-threaded boss 15 on the pipe or coupling 1. The opposite end of the valve stem 6 is provided with a screw-thread 16 and is adapted to engage a screw-threaded socket 17 in the under face of a stepped cone 18. The stepped cone 18 is formed integral or fixed to rotate with the operating rod 19, which operating rod 19 extends through the outer end of the bonnet 13 and is there provided with a hand wheel 20 for rotating the rod 19, and hence the stepped cone 18. The hand wheel 20 is set on a squared upper end 21 of the rod 19 and held in position by means of a nut 22 and jam nut 23. A washer 24 may be interposed between the nut 22 and the hub of the hand wheel 20. The hub of the hand wheel 20 is provided on its end toward the bonnet 13, with a recess 25 in which there is located a coil spring 26 bearing against the outer end of the bonnet 13, and the bottom of the recess 25 in the hub of the hand wheel 20, and having a tendency to draw the operating rod 19 at all times outwardly and hence the stepped cone 18 against its seat. The seat for the stepped cone 18 is formed of some soft metal, preferably Babbitt metal, denoted by 27, which metal is cast within the bonnet 13, with its inner wall conforming to the exterior face of the stepped cone 18. In operation, the stepped cone 18 and operating rod 19 do not change their relation longitudinally with respect to the metallic packing 27, but simply rotate therein, the stepped cone 18 being drawn tightly toward its seat by the spring 26. As the rod 19 is rotated in one direction, the valve stem 6, together with the valve head 4, will be lifted and the head 4 thereby raised from its seat 3 to permit the flow of fluid along through the pipe or coupling 1. When the hand wheel 20 is taken in the opposite direction, the valve head 4 will be forced to its seat. The valve stem 6 is held from rotating by means of the wings 9 and 10 engaging the grooves 11 and 12.

In the form shown in Fig. 3, the nuts 22 and 23, together with the washer 24, are relied upon to hold the stepped cone 18 against its seat of metal packing 27, the hub of the hand wheel 20 being, in this form, without a recess and the spring being dispensed with. As a matter of fact, it is only important that the stepped cone 18 be held snugly against its seat steam or fluid tight at the opening of the valve, since the pressure of the fluid will tend to force the stepped cone 18 toward its seat when once the valve is open, because of the pressure of the fluid against the inner end of the stepped cone tending to force it to its seat as soon as pressure is established within the bonnet. In this form also, one of the wings, 9, is dispensed with, the wing 10 alone being relied upon to hold the valve stem 6 against rotating, and the bonnet 28, corresponding to the bonnet 13, is held to the boss 29 on the pipe by means of an internally screw-threaded flanged nut 30 which has a screw-threaded engagement with the boss 29 and its flange overlaps a flange 31 at the lower edge of the bonnet.

In the form shown in Fig. 4, the hand wheel 20 is replaced by a crank 32 for rotating the valve operating rod 33, corresponding to the valve operating rod 19, but in this instance, extended inwardly from the stepped cone 18 and provided with a crank 34 by means of which it is connected to the valve stem 35 by means of a pintle 36. This latter structure is particularly well adapted to use in connection with a locomotive, marine or stationary throttle valve.

In all the forms shown, the soft metallic packing is fixed in the gland and the stepped cone on the valve operating rod is held in contact with the inner face of the packing and is allowed simply a rotary motion within the packing in order to operate the valve toward and away from its seat.

What I claim is:

1. A valve operating rod provided with a stepped cone fixed to rotate therewith, a soft metal packing fixed in position to engage the surface of the stepped cone, a valve stem having a screw-threaded engagement with the stepped cone, a valve head connected with the valve stem and means for operating the valve operating rod.

2. A valve operating rod provided with a stepped cone fixed to rotate therewith, a bonnet provided with a soft metal packing fixed therein in position to engage the surface of the stepped cone, a valve stem having a screw-threaded engagement with the said stepped cone and provided with a wing engaged with the bonnet to prevent rotation of the valve stem, a valve head connected with the valve stem and means for rotating the valve operating rod.

3. A valve operating rod provided with a stepped cone, a bonnet provided with a soft metal packing fixed in position to engage the surface of the stepped cone, a valve stem having a screw-threaded engagement with the stepped cone, means for preventing the stem from rotating, a valve head swiveled to the stem and means for rotating the valve operating rod.

4. A valve operating rod provided with a cone, a bonnet provided with a soft metal packing in position to engage the surface of the cone, a valve stem having a screw-threaded engagement with the cone, means for preventing the stem from rotating, a valve head connected with the stem and means for rotating the valve operating rod.

In testimony, that I claim the foregoing as my invention, I have signed my name in presence of two witnesses, this twenty-fifth day of July 1910.

JOHN S. CHAMBERS.

Witnesses:
S. S. HENESY,
J. H. PAINTER.